(12) United States Patent
Yanamadala et al.

(10) Patent No.: US 10,964,649 B2
(45) Date of Patent: Mar. 30, 2021

(54) TAMPER DETECTION IN INTEGRATED CIRCUITS

(71) Applicant: Arm Limited, Cambridge (GB)

(72) Inventors: Subbayya Chowdary Yanamadala, Dallas, TX (US); Mikael Yves Marie Rien, Bernin (FR)

(73) Assignee: ARM LIMITED, Cambridge (GB)

( * ) Notice: Subject to any disclaimer, the term of this patent is extended or adjusted under 35 U.S.C. 154(b) by 131 days.

(21) Appl. No.: 16/054,099

(22) Filed: Aug. 3, 2018

(65) Prior Publication Data

US 2020/0043869 A1 Feb. 6, 2020

(51) Int. Cl.

| | |
|---|---|
| *H01L 23/00* | (2006.01) |
| *G01R 31/28* | (2006.01) |
| *H03K 3/03* | (2006.01) |
| *H04L 9/32* | (2006.01) |
| *G01R 31/317* | (2006.01) |
| *G01N 29/02* | (2006.01) |
| *G06F 21/87* | (2013.01) |
| *G01N 27/04* | (2006.01) |

(52) U.S. Cl.
CPC ......... *H01L 23/576* (2013.01); *G01N 27/045* (2013.01); *G01N 29/022* (2013.01); *G01R 31/2884* (2013.01); *G01R 31/31725* (2013.01); *G06F 21/87* (2013.01); *H03K 3/0315* (2013.01); *H04L 9/3278* (2013.01); *G01N 2291/014* (2013.01); *G01N 2291/0426* (2013.01)

(58) Field of Classification Search
CPC .......... G01R 31/31725; G01R 31/2884; G01N 29/022; G01N 2291/014; G01N 2291/0426; G01N 27/045; H03K 3/0315; H01L 23/576; G06F 21/87

USPC ................. 331/46, 108 C, 57, 176
See application file for complete search history.

(56) References Cited

U.S. PATENT DOCUMENTS

| | | | | |
|---|---|---|---|---|
| 7,495,519 B2* | 2/2009 | Kim | ................. | G01R 31/31725 331/44 |
| 7,592,876 B2* | 9/2009 | Newman | ............ | G01R 31/2856 324/762.09 |
| 7,831,873 B1 | 11/2010 | Trimberger et al. | | |
| 8,120,434 B2* | 2/2012 | Rantala | ................ | G01N 29/028 331/57 |

(Continued)

FOREIGN PATENT DOCUMENTS

EP 2876581 A1 5/2015

OTHER PUBLICATIONS

International Search Report and Written Opinion in International Application No. PCT/GB2019/052117, dated Sep. 10, 2019, 14 pages.

*Primary Examiner* — Arnold M Kinkead
(74) *Attorney, Agent, or Firm* — Talem IP Law, LLP (57) ABSTRACT

A system with tamper detection can include at least one ring oscillator and a detection circuit coupled to the at least one ring oscillator to detect change in frequency greater than a tolerance. Each ring oscillator can include a plurality of inverters where at least one intermediate node coupling an output of one of the plurality of inverters and an input to another of the plurality of inverters is a sensing node of a plurality of sensing nodes for the system. Outputs from two or more ring oscillators can be compared and a signal to initiate a countermeasure response can be generated when the outputs have a difference greater than a tolerance value.

19 Claims, 7 Drawing Sheets

(56) References Cited

U.S. PATENT DOCUMENTS

2007/0069875 A1   3/2007   Doi

* cited by examiner

TAMPER DETECTION IN INTEGRATED CIRCUITS

BACKGROUND

Integrated circuits (ICs) may include designs that contain sensitive information. An example of such sensitive information is the secret key information used in crypto engine implementations (such as AES). Attempts to gain access to secure or sensitive information (cryptographic or otherwise) on an IC may be carried out via dropping a measurement probe on the IC and/or physically modifying the IC and generating unauthorized or unintended responses.

BRIEF SUMMARY

Tamper detection in integrated circuits is described herein. The described tamper detection and corresponding circuitry can detect tampering by identifying a change in frequency characteristics of a ring oscillator.

An implementation of a system incorporating tamper detection can include at least one ring oscillator and a detection circuit coupled to the at least one ring oscillator to detect a change in frequency greater than a tolerance. Each ring oscillator is formed of a plurality of inverters, where at least one intermediate node coupling an output of one of the plurality of inverters and an input to another of the plurality of inverters is a sensing node of a plurality of sensing nodes for the system. In some cases, at least half the intermediate nodes coupling the outputs of the inverters to the corresponding inputs of the inverters are sensing nodes. The sensing nodes can be disposed in a top-level metal line. The sensing nodes can be shaped in lines or large pads to cover areas over circuit blocks of an IC.

In some cases, the detection circuit includes one or more comparators. Two or more ring oscillators can be coupled to a comparator that detects when at least one of the two or more ring oscillators has the change in frequency greater than the tolerance.

In some cases, the sensing nodes can cover a chip or a portion of the chip in a manner that a probe would touch at least one sensing node or portions of the sensing node would have to be removed to avoid touching that sensing node. The sensing nodes can be disposed at a top-most metal layer level, a top metal layer level, interspersed in lower-level metal, on a backside metal layer, or a combination thereof. The invertors of the at least one ring oscillator can be dispersed throughout the chip, around or between functional circuit or logic blocks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1A illustrates a normal state without tampering. FIG. 1B illustrates effect of tampering.

DETAILED DESCRIPTION

Tamper detection in integrated circuits is described herein. The described tamper detection and corresponding circuitry can protect secure or sensitive information that might be contained on an IC by identifying a change in frequency characteristics of a ring oscillator.

Figure 1A:
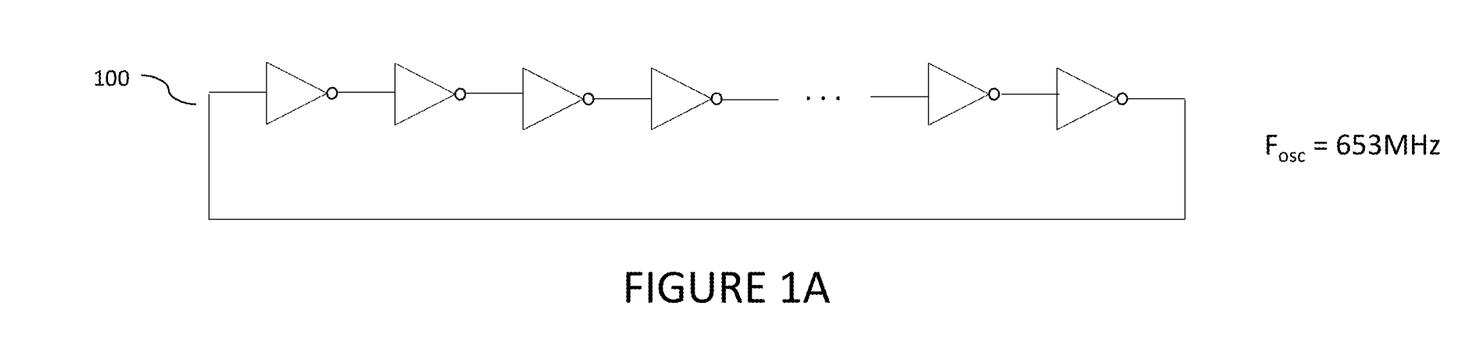
FIGS. 1A-1B illustrate an example schematic representation of a sensor for tamper detection.
Figure 1B:
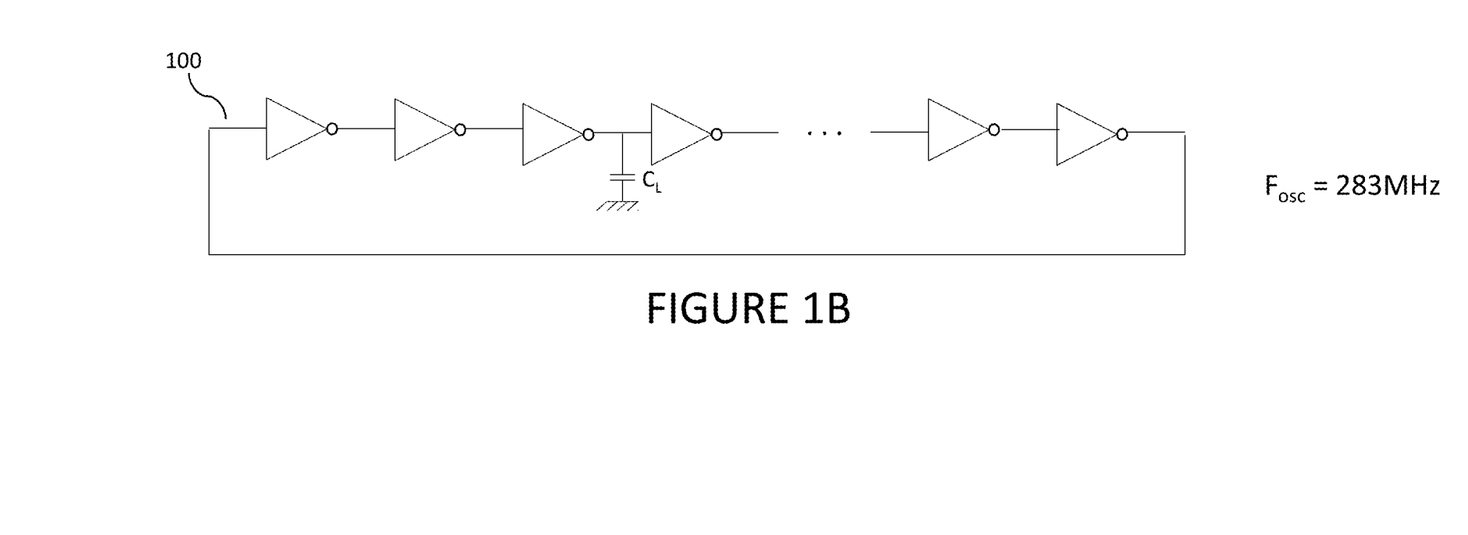

FIGS. 1A-1B illustrate an example schematic representation of a sensor for tamper detection. FIG. 1A illustrates a normal state without tampering. FIG. 1B illustrates effect of tampering.

Referring to FIG. 1A, a sensor 100 for tamper detection can include a ring oscillator. The ring oscillator can include a plurality of inverters connected in series to form a closed loop that has a certain oscillation frequency during a normal state. For example, a sensor 100 implemented with 56 inverters (7FF node) may have an oscillation frequency of 653 MHz. A probe may be dropped on a chip to measure a signal.

Referring to FIG. 1B, when a probe contacts an area of a pad for a node of the sensor 100, the contact of the probe creates an additional capacitance, modeled as $C_L$, on a node of the sensor 100. Due to the additional capacitance $C_L$, the oscillation frequency of sensor 100 drops, for example, from 653 MHz to 283 MHz. This drop in the frequency is significant (e.g., outside of typical drifting that may occur due to process, temperature, and voltage), and can be easily detected. In addition to probe contact, the described sensors may detect tampering including a cut in pads/lines or removal of parts of the pad (and application of a conductive material to mimic the original connection) due to the change in frequency caused by the change in capacitance or resistance from the removal (and possible addition of conductive material, which is usually different than the material used for the pad).

The inverters of the ring oscillator sensor can be formed in the active layer of the chip. In some cases, the inverters can be dispersed throughout the chip, distributed around or between functional circuit or logic blocks of the chip. In some cases, two or more ring oscillators can be provided.

Figure 2A:
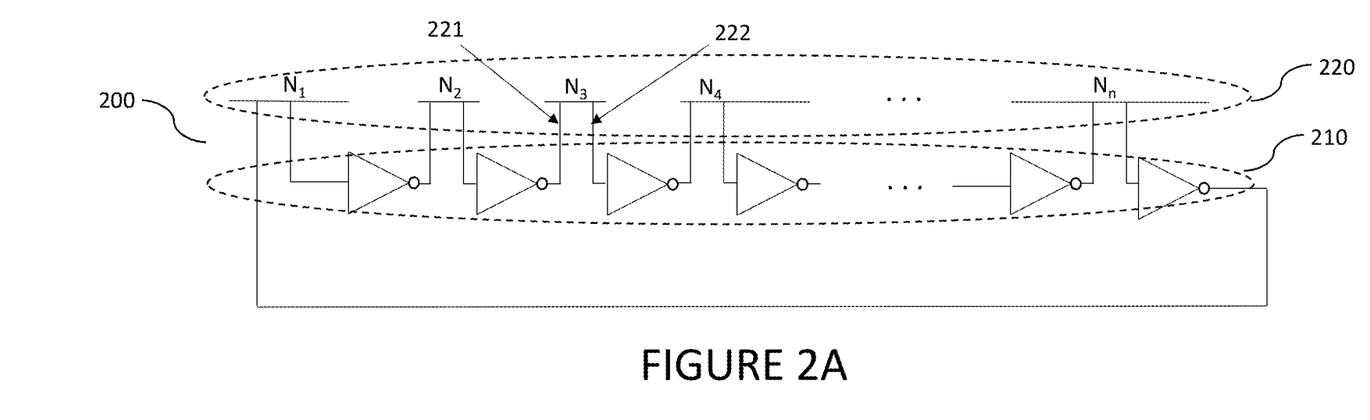
FIG. 2A shows a conceptual representation of a sensor for tamper detection.
Figure 2B:
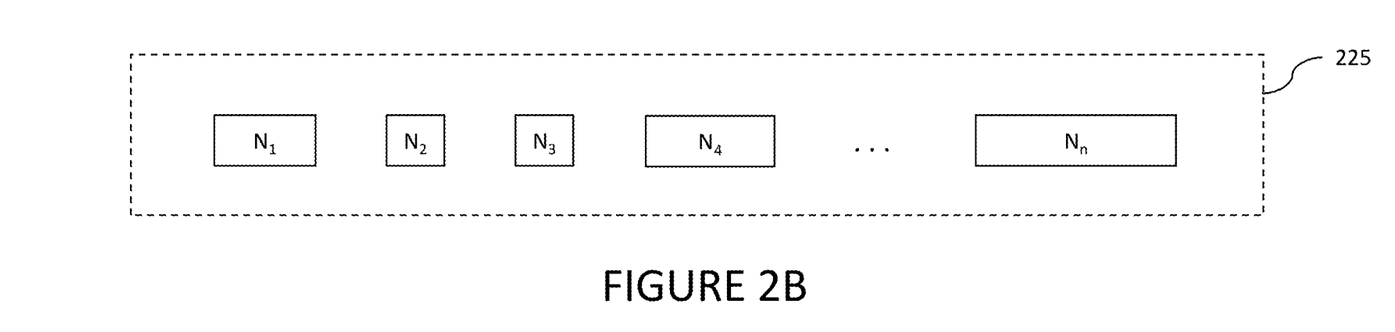
FIGS. 2B and 2C show example layout views of sensing nodes of a sensor for tamper detection.
Figure 2C:
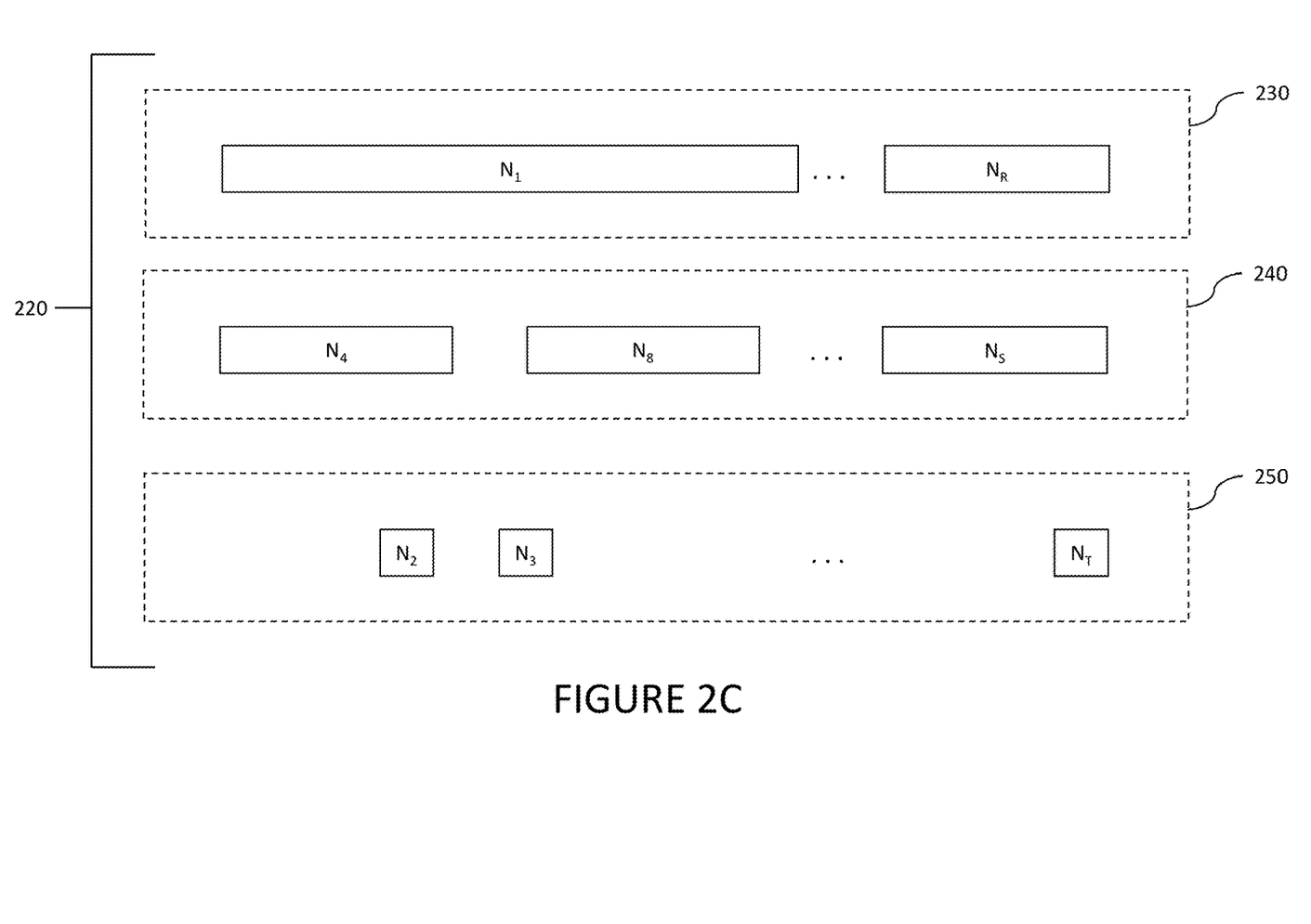
Figure 2D:
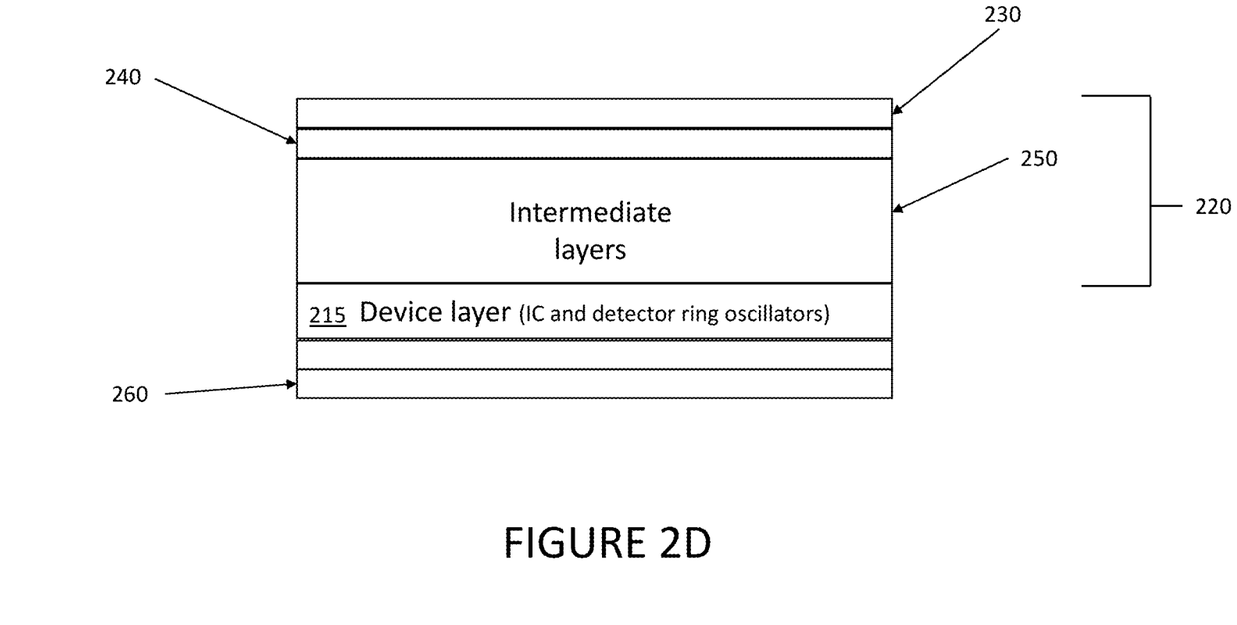
FIG. 2D shows a cross-sectional view of layers of an IC incorporating sensors for tamper detection

FIG. 2A shows a conceptual representation of a sensor for tamper detection; FIG. 2B-2C show example layout views of sensing nodes of a sensor for tamper detection; and FIG. 2D shows a cross-sectional view of layers of an IC incorporating sensors for tamper detection. Referring to FIG. 2A, a sensor 200 includes a plurality of inverters 210. The inverters 210 can be distributed around or between functional circuit or logic blocks of a chip. To form the ring oscillator configuration such as described with respect to FIG. 1A, one or more intermediate nodes providing connections between inventors (e.g., intermediate nodes corresponding to $N_1, N_2, \ldots, N_n$) can go up to a metal line 220. An output of each inverter (e.g., 221) and an input to each inverter (e.g., 222) are coupled to each other via an intermediate node (e.g., $N_3$). At least one intermediate node is a sensing node (which can also be referred to as an intermediate sensing node or simply "sensing node") that is disposed in one of the metal layers 220 of an IC chip.

As illustrated in FIG. 2D, the sensing nodes can be disposed at a top metal layer level (see e.g., top metal layer 225 of FIG. 2B), which may be a topmost 230 or just a high metal level 240; interspersed in lower-level metal 250 (e.g., in an intermediate layer); on a backside metal layer 260; or a combination thereof (see e.g., arrangement shown in FIG. 2C).

A sensing node forms a sensor pad and can be shaped in lines or large pads to cover areas of an underlying circuit fabricated in a device layer 215 of an IC chip (which can include the IC circuitry and the detector ring oscillator(s)). For example, the sensing nodes can each have a size greater than or equal to a contact pad width (as defined by the layout technology minimum widths for a metal contact coupled to a via—which can depend on foundry and process). In addition, the sizes and shapes of the sensing nodes can be the same or vary between a same ring oscillator or between different ring oscillators (when multiple ring oscillators are formed for tamper detection of an IC). The sensing nodes (e.g., one or more of $N_1, N_2, \ldots,$ and $N_n$) may create a blanket that, when removed, cut, or contacted by a probe, causes a change in the oscillation frequency of the ring oscillator formed by the connected inverters.

For example, referring to FIG. 2B, sensing nodes ($N_1, N_2, \ldots, N_n$) can be disposed in a top-level metal 230. Although the sensing nodes are shown in a row and of different sizes, the pads forming the sensing nodes may be disposed in any suitable arrangement. It should also be understood that the top-level metal may not be the topmost metal of a chip.

As another example, referring to FIG. 2C, the sensing nodes can be disposed in multiple metal layers. In the illustrative example, intermediate nodes $N_1, N_2, \ldots,$ and $N_n$ include sensing nodes in two levels of metal and some intermediate nodes that do not go up to higher levels of metal (and in some cases may not be provided as "sensing nodes" with respect to size and shape). Here, intermediate nodes $N_1 \ldots N_R$ are sensing nodes disposed in a top-level metal 230, intermediate nodes $N_4, N_8 \ldots N_S$ are sensing nodes disposed in a metal level 240 below the top-level metal 230. The metal level 240 may be the level directly below the top-level metal 230 or more than one level below the top-level metal 230. The other intermediate nodes, intermediate nodes $N_2, N_3 \ldots N_T$, can be disposed in an intermediate layer. In some cases, some intermediate nodes may be disposed on the device layer 215 in a polysilicon layer. As can be seen from FIG. 2C, the shapes and sizes of the sensing nodes can vary.

Figure 3A:
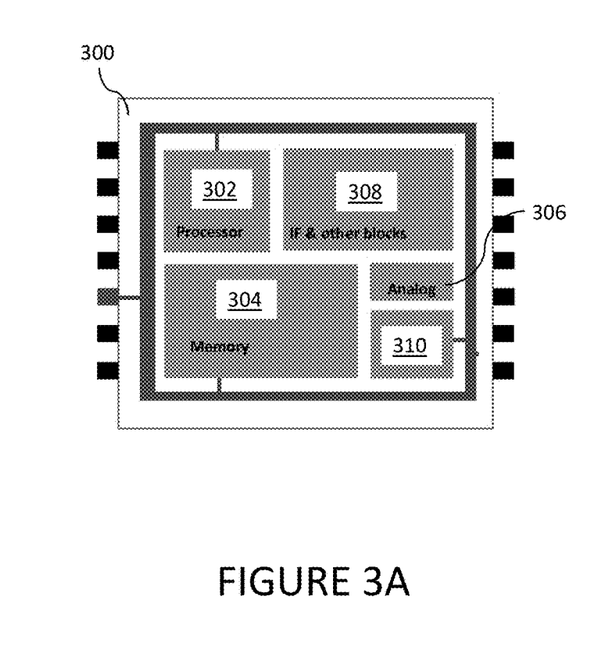
FIG. 3A shows a simplified view of an IC with various blocks.
Figure 3B:
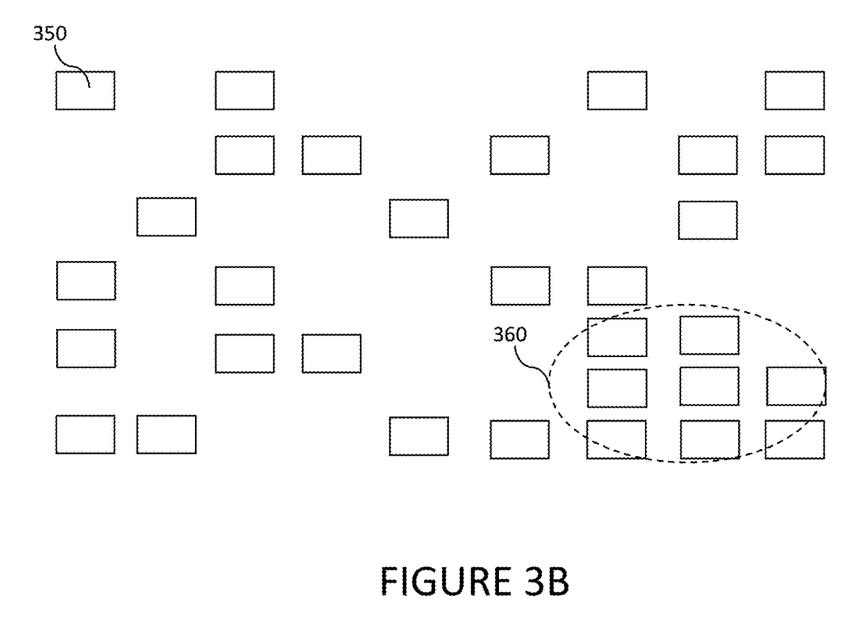
FIG. 3B shows an example of sensor nodes over an IC.

FIG. 3A shows a simplified view of an IC with various blocks; and FIG. 3B shows an example of sensor nodes over an IC. Referring to FIG. 3A, a chip 300 implementing an IC can include a plurality of different circuit blocks and sub-blocks, including, but not limited to, a processor 302, memory 304, analog circuitry 306, interface circuitry and other blocks 308, as well as a block for sensitive operations 310 (e.g., a cryptographic block). The described sensing nodes can be disposed over the IC 300 covering the various blocks. For example, as shown in FIG. 3B, sensing nodes 350 may be disposed above the IC in any suitable pattern, including but not limited to, random, patchwork, mosaic, array, and checkerboard. In some cases, a higher density of sensing nodes 350 may be arranged in regions where it is expected that a measurement probe may be dropped, for example in region 360, which may correspond to the area over sensitive operations block 310. A chip 300 may have multiple areas of dropping a measurement probe that can exist within the IC, and different countermeasure responses may be desired depending on where the probe is dropped. Each of the nodes shown in FIG. 3B may be an intermediate node of a ring oscillator. In some cases, dummy nodes may be included to obfuscate which nodes are sensing nodes.

Figure 4A:
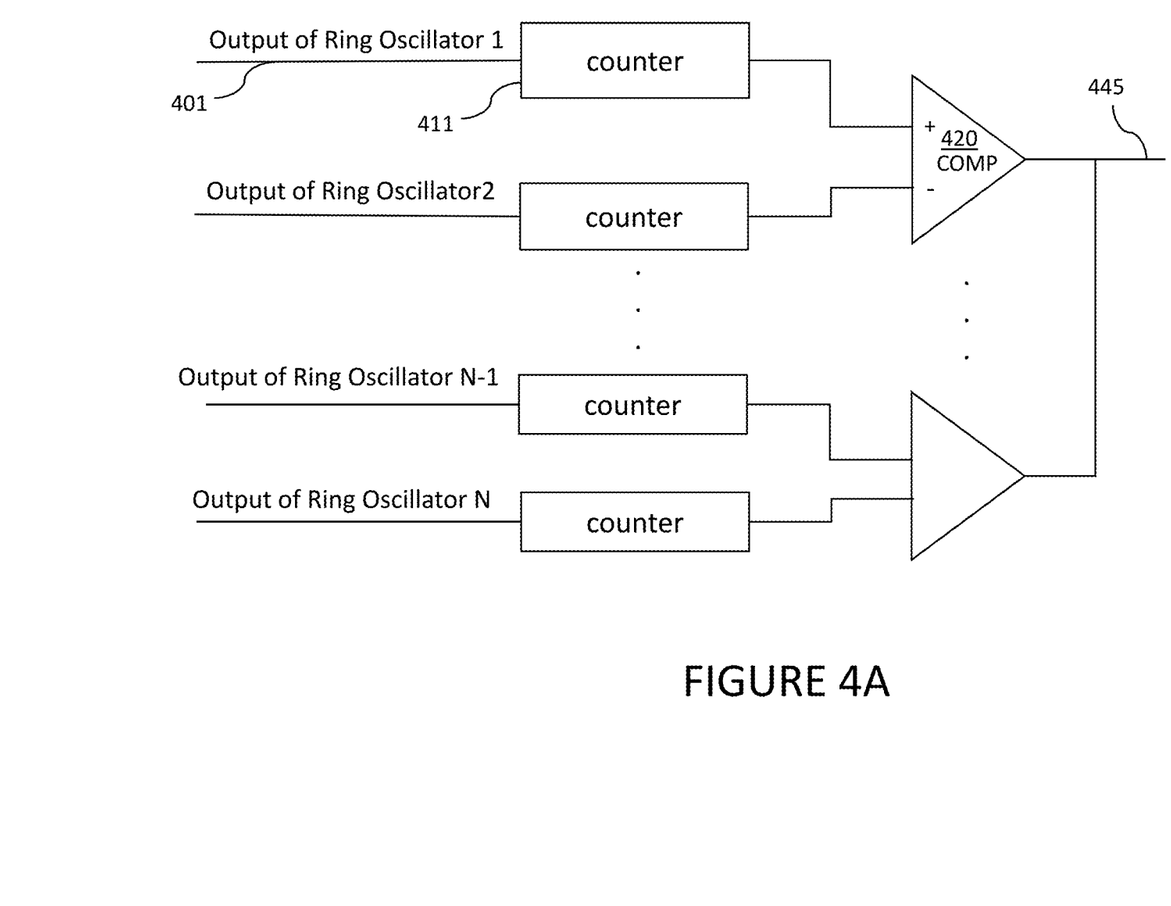
FIGS. 4A and 4B illustrate example detector configurations for detecting a change in frequency characteristics of ring oscillators of a sensor.
Figure 4B:
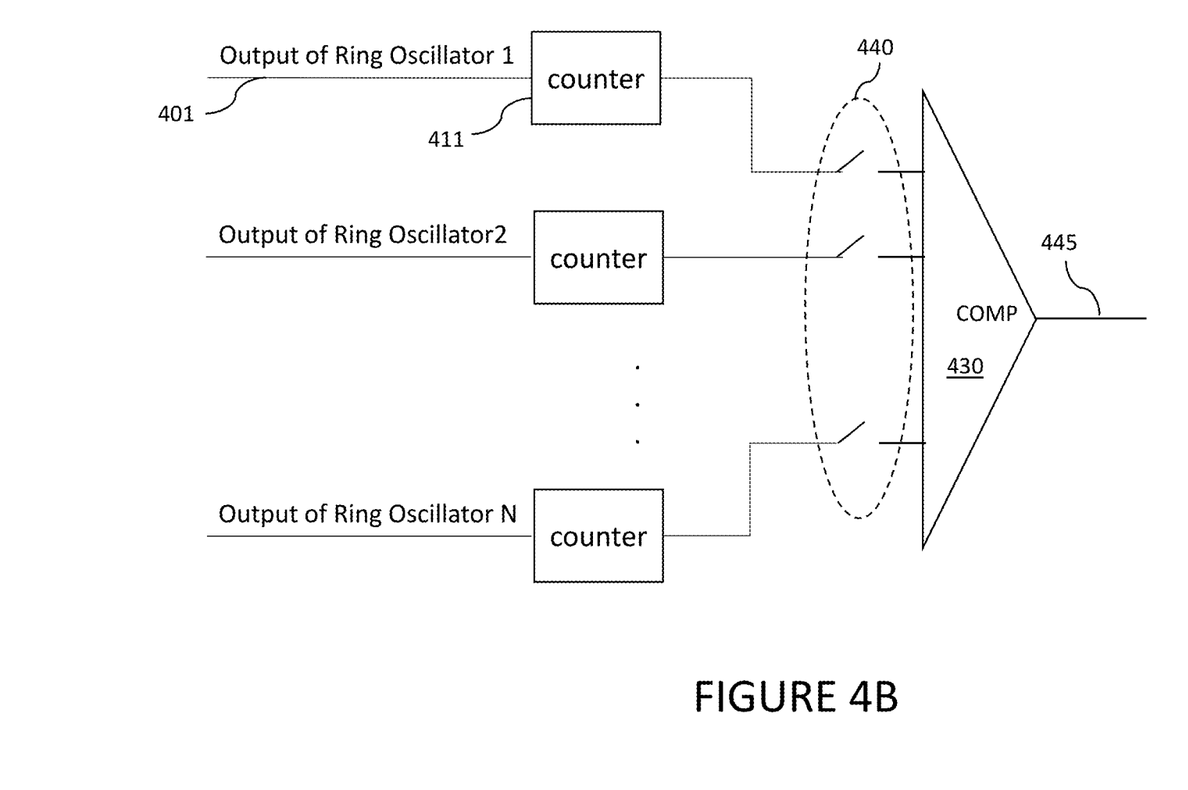

FIGS. 4A and 4B illustrate example detector configurations for detecting a change in frequency characteristics of ring oscillators of a sensor. Multiple ring oscillators can be disposed in an IC to provide a sensor for tamper detection. Tampering of the IC, for example by removing or cutting material from an IC or by applying a probe, can be detected by a detector comparing the oscillation frequencies of the multiple ring oscillators and monitoring if there is one or more of the oscillation frequencies that deviate from the others by more than a threshold amount.

Referring to both FIG. 4A and FIG. 4B, there may be N ring oscillators (where N is a natural number) in a sensor group. Each oscillator may be configured such as described with respect to FIGS. 2A-2D and designed to have the same oscillating frequency. The frequency value of each ring oscillator (e.g., from ring oscillator 1 401) can be "measured" by a readout circuit that includes a counter (e.g., counter 411) coupled to each ring oscillator.

Each counter (e.g., 411) may count rising or falling edges of a corresponding ring oscillator output to determine a frequency value. A comparator (e.g., 420 of FIG. 4A; 430 of FIG. 4B) can compare the counts of two or more ring oscillators to determine whether there is a significant difference (e.g., larger than a threshold) in frequency between the two or more ring oscillators. A difference is considered to be significant if it is larger than some tolerance value. A plurality of ring oscillators can be provided, where each ring oscillator is laid out similar to the others in order to have similar frequencies.

The oscillation frequencies can be compared to each other in various combinations. In some cases, the change in frequency may be detected by comparing the frequencies of the ring oscillators two-by-two. In some cases, the change in frequency may be detected by comparing each ring oscillator to the others.

For example, if there are 20 ring oscillators in a sensor, the oscillation frequency of one ring oscillator can be compared to one of the other ring oscillators of that sensor group, providing 10 pairs for comparison, or of another sensor group or reference oscillator, providing 20 pairs for comparison (where the second of the pair may be the same reference oscillator). As another example, the oscillation frequency of each ring oscillator can be compared to the other 19. As another example, the oscillation frequencies of the ring oscillators are compared to each other in groups of fewer than the 20 of the sensor.

As illustrated in FIG. 4A, when comparing oscillator frequencies two-by-two, each oscillator pair may be coupled to a corresponding comparator 420. As illustrated in FIG. 4B, a single comparator 430 may be used along with a switch network 440 to select which pairs of ring oscillators are being compared. The outputs of the ring oscillators can be selectively coupled to the comparator 430 in pairs. A signal 445 output by the comparator (e.g., comparator 420, 430) can be used to initiate a countermeasure/mediation response. For example, if the comparator determines that the difference between frequencies is greater than a tolerance value, an error signal may be output. The error output of any comparator can initiate a countermeasure response. As explained with respect to FIGS. 3A and 3B, different sensor groups can be used to initiate different responses.

A method of protecting against tamper attacks can include comparing outputs from two or more ring oscillators; and generating a signal to initiate a countermeasure response when the outputs have a difference greater than a tolerance value. For example, the method can include receiving a first output of a first ring oscillator of a set of ring oscillators, each ring oscillator configured such as described with respect to FIGS. 2A and 2B; receiving a second output of a second ring oscillator of the set of ring oscillators; comparing the first output to the second output; and generating a signal to initiate a countermeasure response when the first output is different from the second output by greater than a tolerance value. In some cases, comparing the first output to the second output includes retrieving a first value from a first counter, the first value representing a first frequency of the first ring oscillator; retrieving a second value from a second counter, the second value representing a second frequency of the second ring oscillator; and comparing the first value to the second value using a comparator. In some cases, the method can further include contiguously comparing pairs of ring oscillators of the set of ring oscillators and/or periodically comparing the first output to the second output as the first output and the second output are continuously received. In some cases, the comparison occurs at the start-up of the IC. For example, upon reset of a cryptographic circuit.

In some cases, a significant deviation of the oscillation frequency of one or more of the ring oscillators may trigger a reset of the system to prevent an adversary doing any more interesting measurements or influencing on the behavior of the circuit. The particular countermeasure response implemented by the system can be to reset, halt, or disable the system, obfuscate data operations, or perform another appropriate countermeasure response. For example, a countermeasure response that obfuscates or alters the data in some manner can be determined by the IC designer. One such approach can be to switch from performing a proper response to performing an improper response. An improper response refers to the responses intended to create power signatures which are indicative of a different key or a random key.

In some cases, a comparator may, instead of comparing two ring oscillators, compare a ring oscillator frequency with a value stored in a register.

Any reference in this specification to "one embodiment," "an embodiment," "example embodiment," "an example", "some examples", etc., means that a particular feature, structure, or characteristic described in connection with the embodiment or example is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system, comprising:
    a plurality of sensing nodes, each sensing node of the plurality of sensing nodes being formed of metal, wherein the sensing nodes of the plurality of sensing nodes each have a size greater than or equal to a contact pad width;
    at least one ring oscillator, each ring oscillator comprising a plurality of inverters coupled to each other in a ring via intermediate nodes, wherein at least one intermediate node couples to an output of one of the plurality of inverters, and wherein an input to another of the plurality of inverters is a sensing node of the plurality of sensing nodes; and
    a detection circuit coupled to the at least one ring oscillator to detect change in frequency greater than a tolerance.

2. The system of claim 1, wherein the plurality of sensing nodes is disposed in a top-level metal layer.

3. The system of claim 1, further comprising an integrated circuit comprising circuit blocks on a chip, wherein the sensing nodes are disposed above the circuit blocks on the chip.

4. The system of claim 3, wherein the plurality of inverters is distributed throughout and between circuit blocks of the chip.

5. The system of claim 3, wherein the sensing nodes are arranged in a random pattern.

6. The system of claim 3, wherein the sensing nodes are arranged in a patchwork or checkerboard pattern.

7. The system of claim 1, wherein the detection circuit comprises a comparator.

8. A system, comprising:
    a plurality of sensing nodes;
    two or more ring oscillators, each ring oscillator of the two or more ring oscillators comprising a plurality of inverters coupled to each other in a ring via intermediate nodes, wherein at least one intermediate node coupling an output of one of the plurality of inverters and an input to another of the plurality of inverters is a sensing node of the plurality of sensing nodes; and
    a detection circuit coupled to the two or more ring oscillators to detect change in frequency greater than a tolerance, wherein the detection circuit comprises a comparator,
    wherein a first ring oscillator of the two or more ring oscillators has a first output coupled to the comparator and a second ring oscillator of the two or more ring oscillators has a second output coupled to the comparator such that the first and second outputs are compared to each other via the comparator.

9. A system, comprising:
    a plurality of sensing nodes;
    two or more ring oscillators, each ring oscillator of the two or more ring oscillators comprising a plurality of inverters coupled to each other in a ring via intermediate nodes, wherein at least one intermediate node coupling an output of one of the plurality of inverters and an input to another of the plurality of inverters is a sensing node of the plurality of sensing nodes; and
    a detection circuit coupled to the two or more ring oscillators to detect change in frequency greater than a tolerance, wherein the detection circuit comprises a comparator,
    wherein outputs of the two or more ring oscillators are selectively coupled the comparator such that at least two outputs of the two or more ring oscillators are compared to each other via the comparator.

10. The system of claim 9, wherein the outputs of the two or more ring oscillators are selectively coupled to the comparator in pairs.

11. The system of claim 9, wherein the outputs of the two or more ring oscillators are selectively coupled to the comparator such that each output is compared to the other outputs of the two or more ring oscillators.

12. The system of claim 7, further comprising at least one counter, the output of a ring oscillator being coupled to the comparator through one of the at least one counter.

13. A method comprising:
receiving a first output of a first ring oscillator of a set of ring oscillators;
receiving a second output of a second ring oscillator of the set of ring oscillators;
comparing the first output to the second output; and
generating a signal to initiate a countermeasure response when the first output is different from the second output by greater than a tolerance value,
wherein each ring oscillator of the set of ring oscillators, including the first ring oscillator and the second ring oscillator, comprises a plurality of inverters,
wherein for each ring oscillator, including the first ring oscillator and the second ring oscillator:
at least one intermediate node couples to an output of one of the plurality of inverters, and
an input to another of the plurality of inverters is a sensing node of a plurality of sensing nodes.

14. The method of claim 13, wherein comparing the first output to the second output comprises:
retrieving a first value from a first counter, the first value representing a first frequency of the first ring oscillator;
retrieving a second value from a second counter, the second value representing a second frequency of the second ring oscillator; and
comparing the first value to the second value using a comparator.

15. The method of claim 13, further comprising:
comparing pairs of ring oscillators of the set of ring oscillators.

16. The method of claim 15, further comprising:
selectively coupling the pairs of the ring oscillators to a comparator.

17. The method of claim 13, further comprising:
periodically comparing the first output to the second output as the first output and the second output are continuously received.

18. The method of claim 13, further comprising:
comparing two outputs received from a second set of ring oscillators; and
generating a signal to initiate a second countermeasure response when the two outputs received from the second set of ring oscillators has a difference greater than the tolerance value.

19. The method of claim 18, wherein the second countermeasure response is different than the countermeasure response.

* * * * *